(12) United States Patent  
Steinich

(10) Patent No.: US 7,855,551 B2  
(45) Date of Patent: Dec. 21, 2010

(54) STICK POSITION SENSOR WITH REMOVABLE COVER FOR A SENSOR HEAD

(75) Inventor: Klaus Manfred Steinich, Zorneding (DE)

(73) Assignee: ASM Automation Sensorik Messtechnik GmbH, Moosinning, DE (US)

(*) Notice: Subject to any disclaimer, the term of this patent is extended or adjusted under 35 U.S.C. 154(b) by 786 days.

(21) Appl. No.: 11/642,017

(22) Filed: Dec. 19, 2006

(65) Prior Publication Data

US 2007/0139041 A1 Jun. 21, 2007

(30) Foreign Application Priority Data

Dec. 19, 2005 (DE) ............... 10 2005 060 676

(51) Int. Cl.  
*G01B 7/14* (2006.01)

(52) U.S. Cl. ................................. 324/207.13

(58) Field of Classification Search ............ 324/207.13  
See application file for complete search history.

(56) References Cited

U.S. PATENT DOCUMENTS

| | | | | |
|---|---|---|---|---|
| 3,898,555 A | * | 8/1975 | Tellerman | 324/207.13 |
| 4,839,590 A | * | 6/1989 | Koski et al. | 324/207.21 |
| 5,258,707 A | * | 11/1993 | Begin et al. | 324/207.13 |
| 5,590,091 A | | 12/1996 | Gloden et al. | |
| 5,736,855 A | | 4/1998 | Smith et al. | |
| 2001/0052772 A1 | | 12/2001 | Barr et al. | |
| 2004/0090225 A1 | * | 5/2004 | Barr et al. | 324/207.13 |
| 2005/0081710 A1 | | 4/2005 | Albright et al. | |
| 2005/0189937 A1 | | 9/2005 | Blubaugh et al. | |

OTHER PUBLICATIONS

DE 20 2004 002 891 U1 Aug. 11, 2005 MTS Sensor Technologie GmbH & Co.  
DE 101 53 489 A1 Oct. 23, 2001 Balluf GmbH Figs 1-3, Col. 7.

* cited by examiner

*Primary Examiner*—Jay M Patidar  
(74) *Attorney, Agent, or Firm*—Head, Johnson & Kachigian, P.C.

(57) ABSTRACT

The present invention refers to position sensors in stick design, for installation in hydraulic cylinders, which may be maintained and replaced without having to open the hydraulic system of the cylinder and thus causing leakage. According to the invention the sensor includes a sensor head housing having an attachable and detachable sensor head cover which can be opened without removing the remaining housing out of the piston cylinder unit. Opening of the sensor-head-cover allows easy access to the functional components of the sensor.

17 Claims, 17 Drawing Sheets

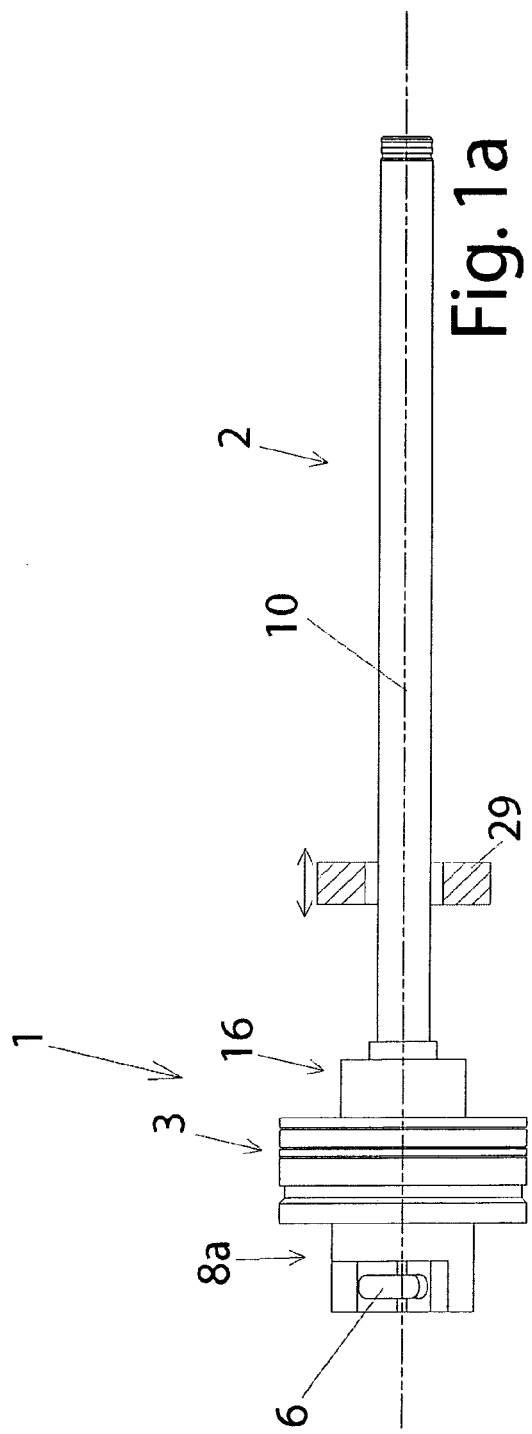
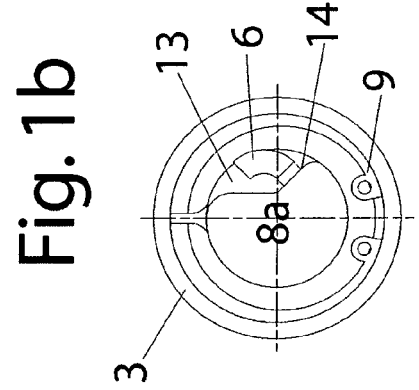

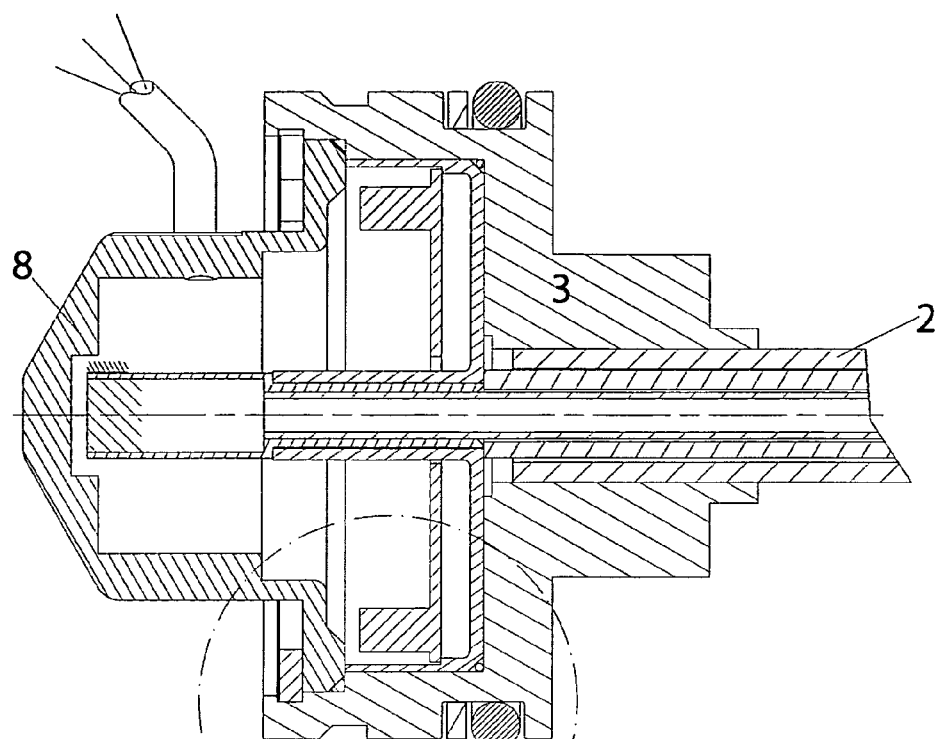
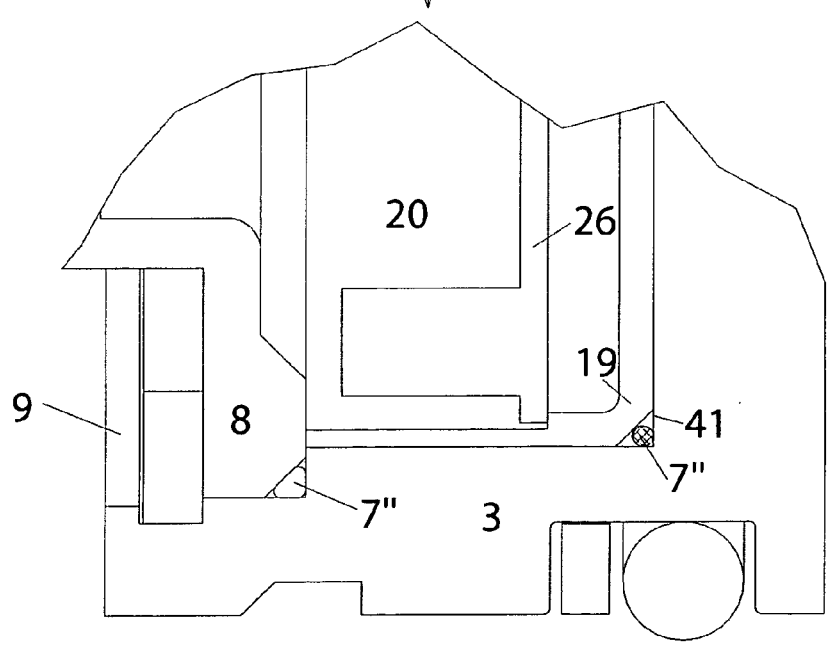
Fig. 2f

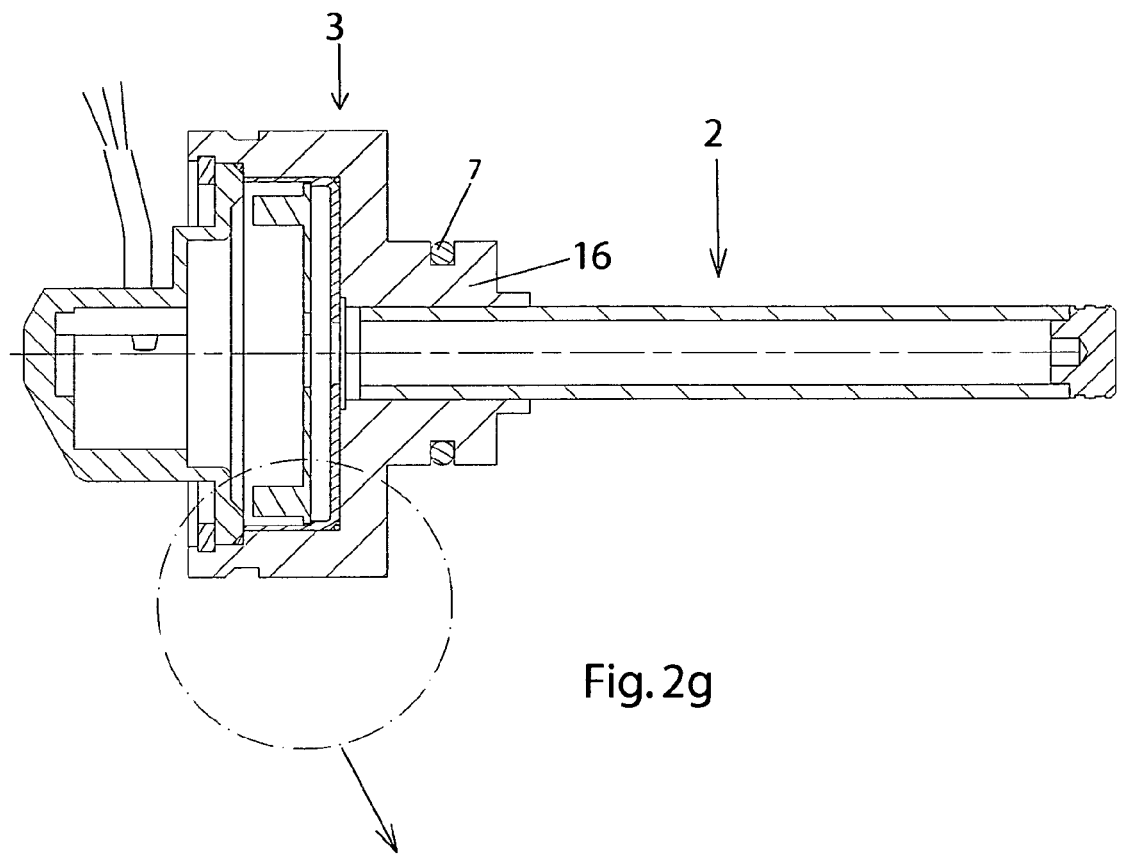
Fig. 2g
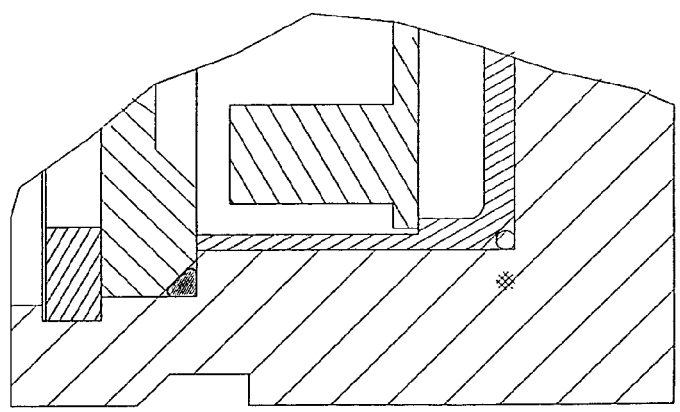

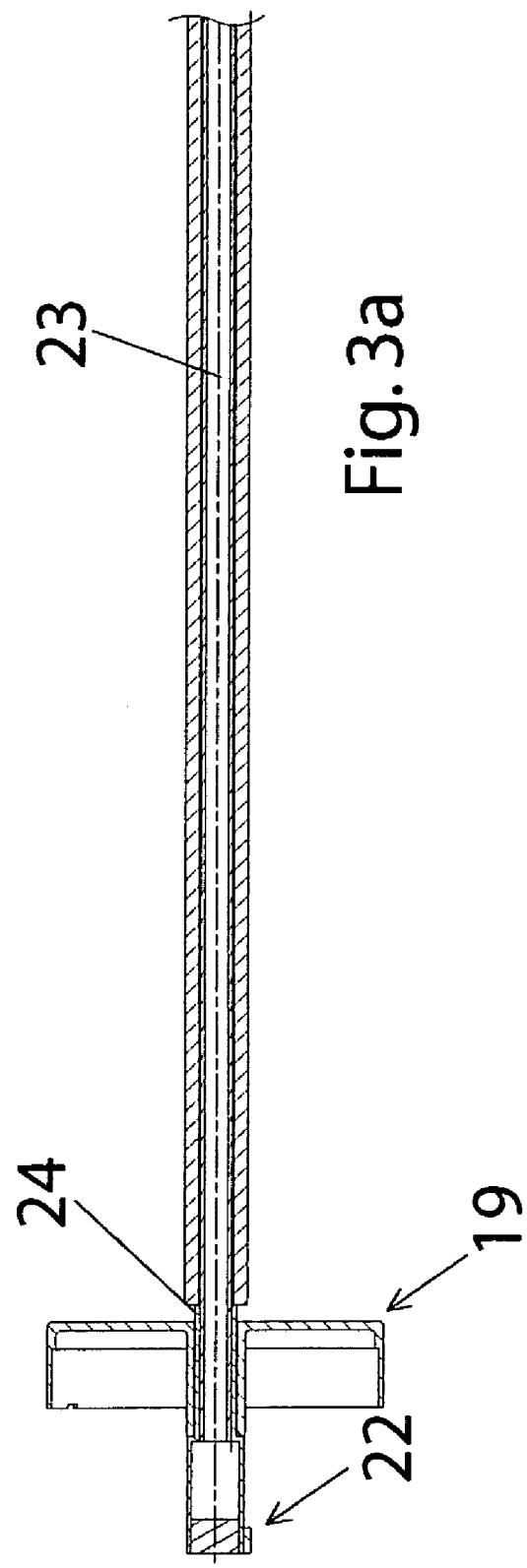

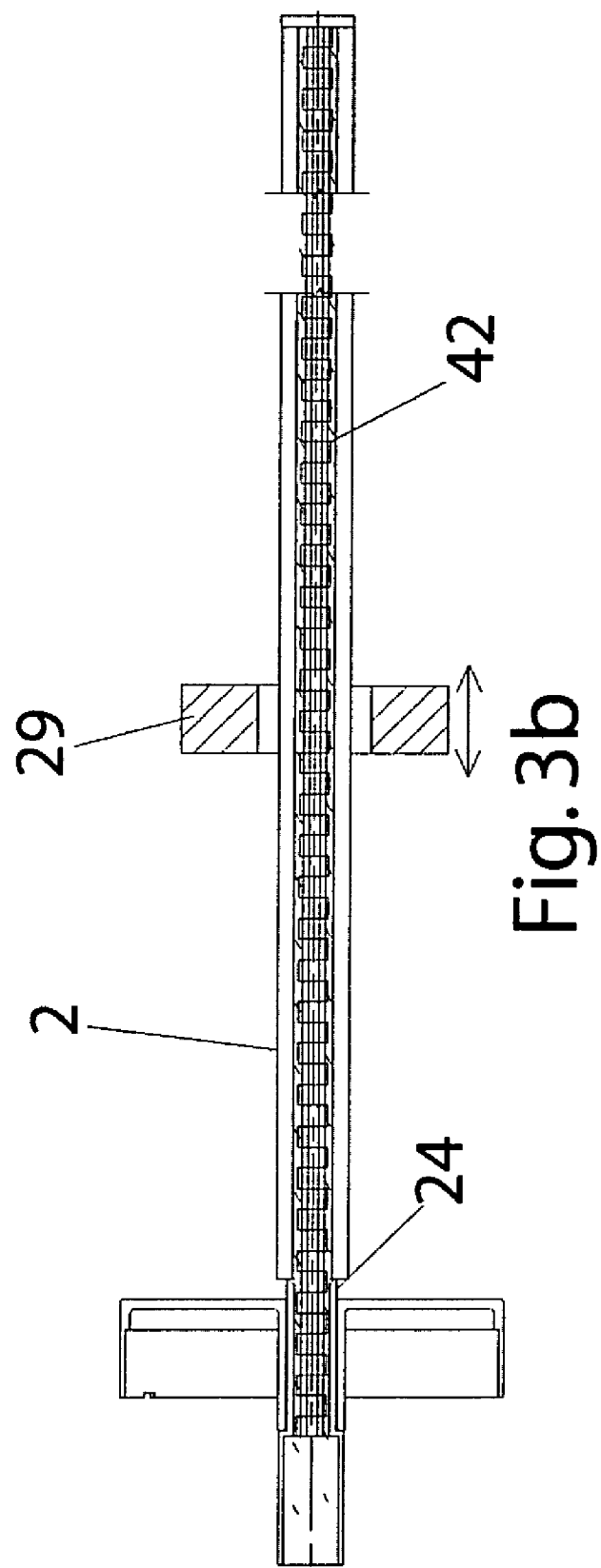

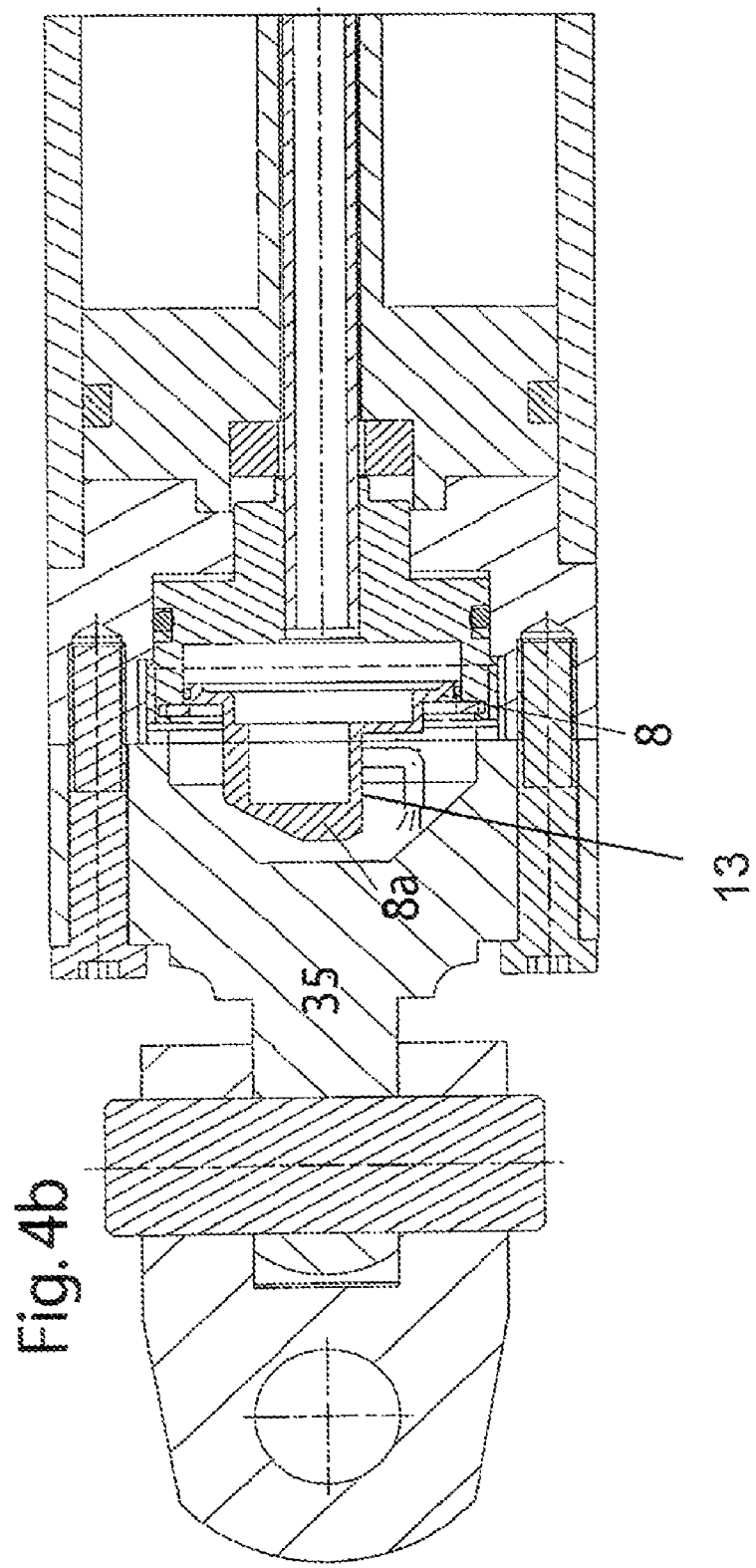

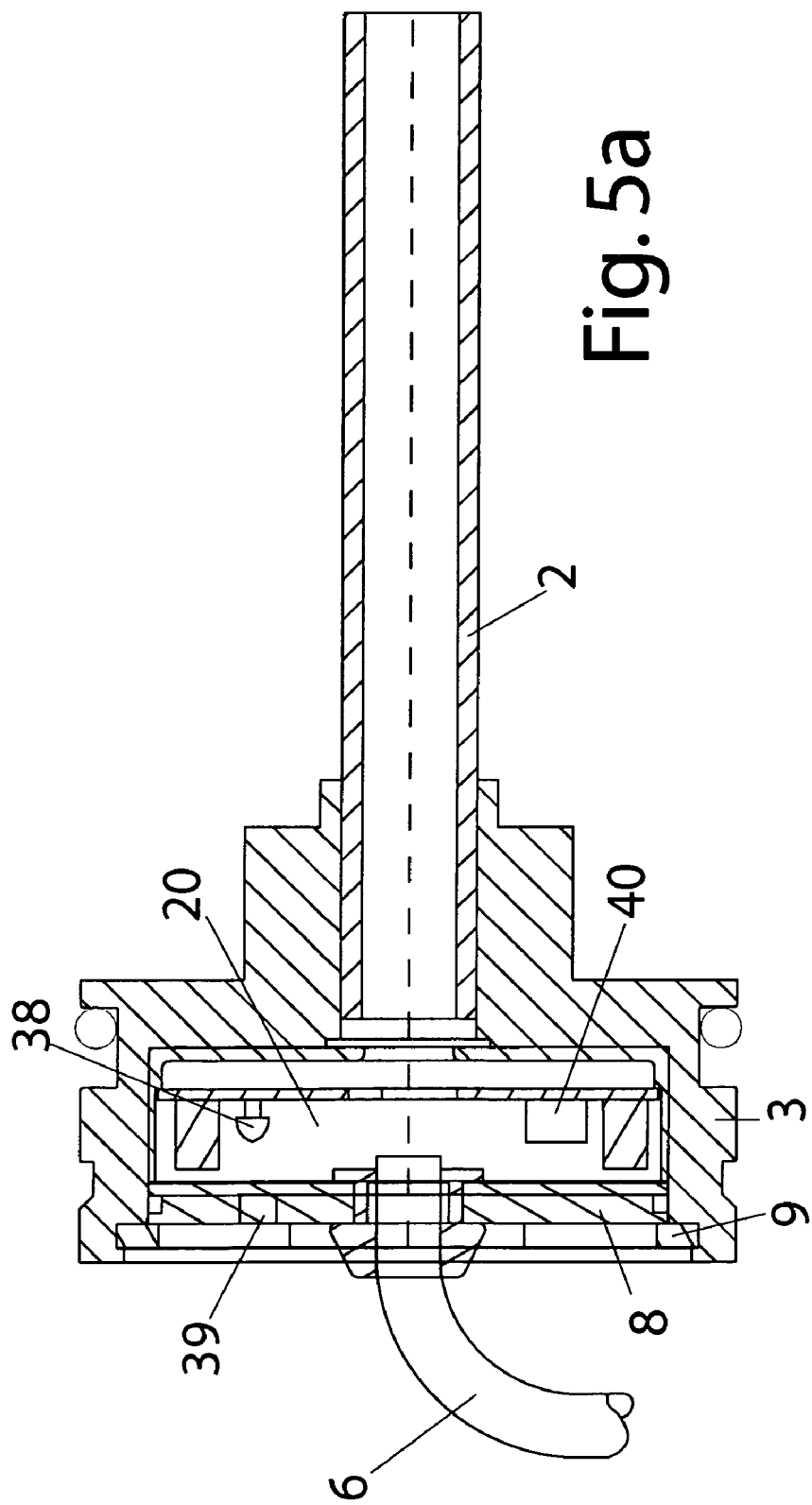

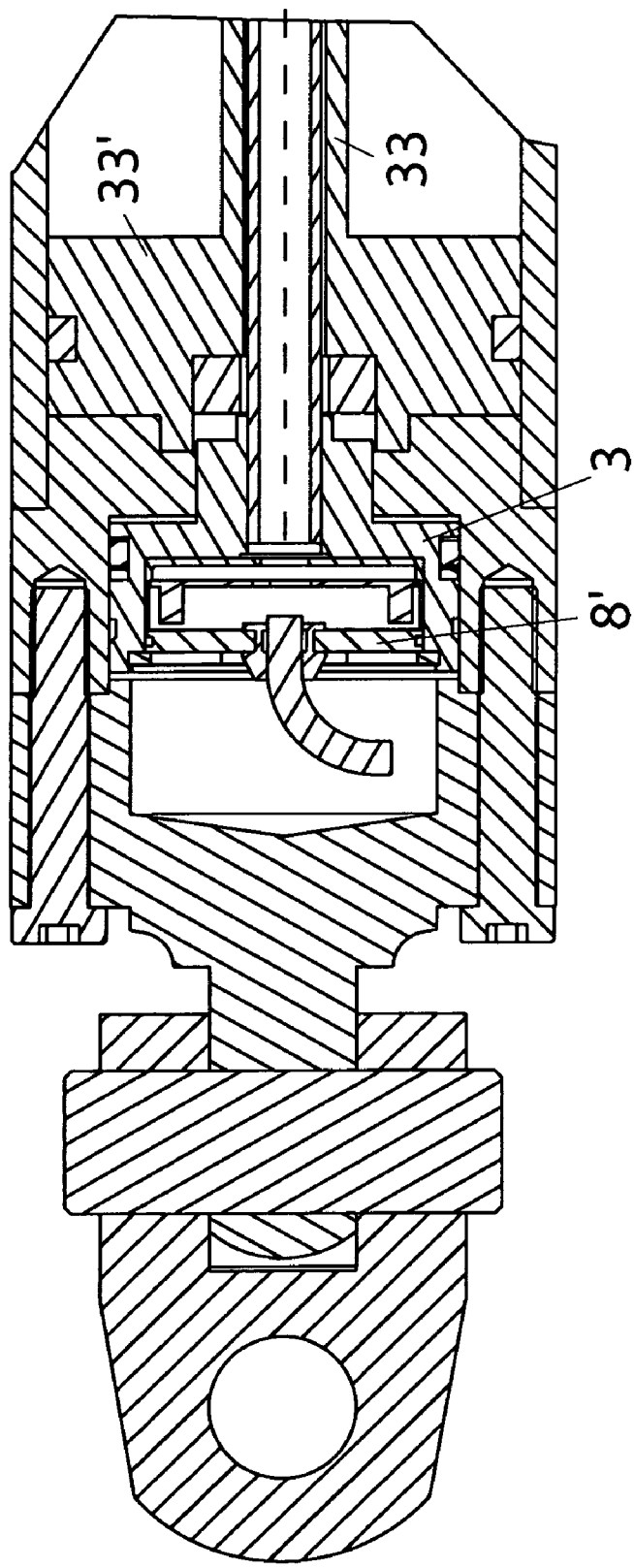

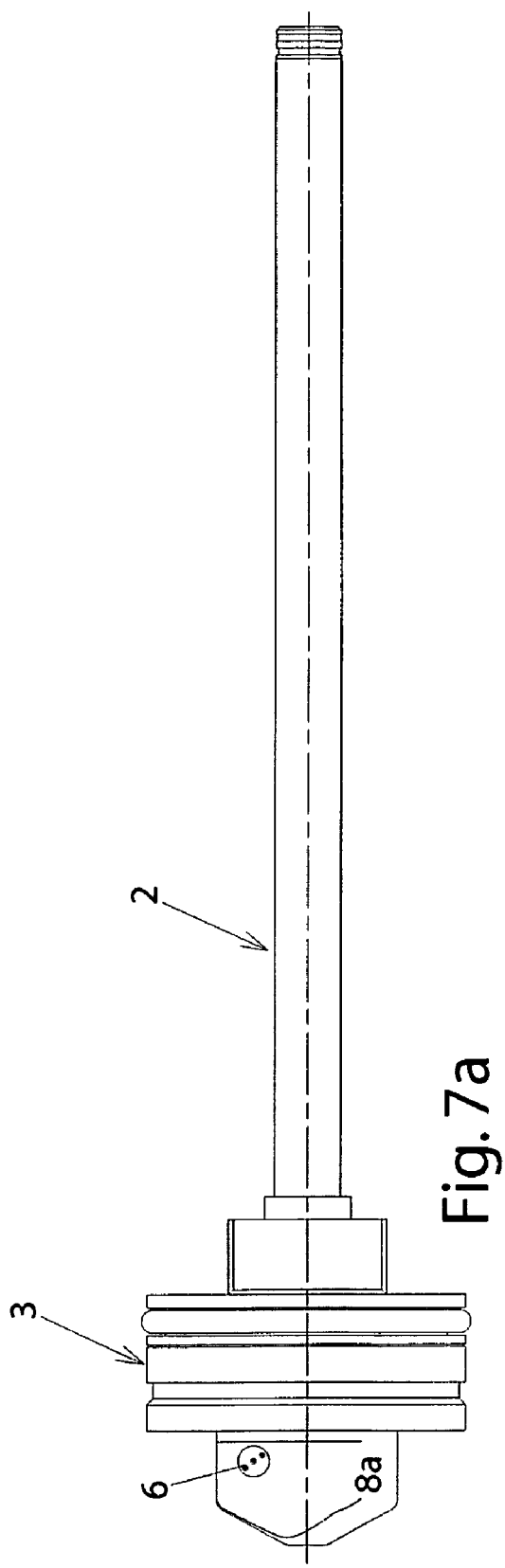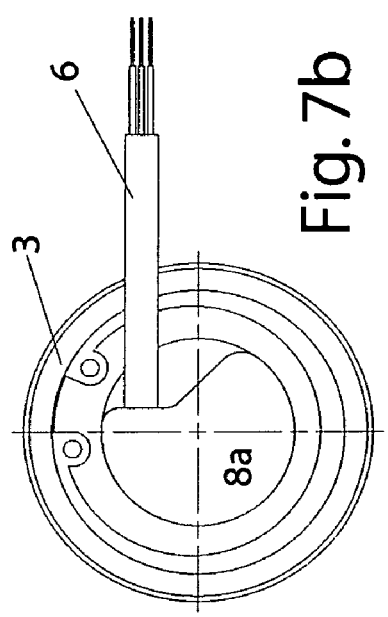

STICK POSITION SENSOR WITH REMOVABLE COVER FOR A SENSOR HEAD

CROSS-REFERENCE TO RELATED APPLICATIONS

This application claims priority to Germany Patent Application No. 102005060676.8 filed 19 Dec. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention regards position sensors in stick form according to a non-contacting functional principle for application in fluids, among other things. Position sensors in stick form measure the position of a position indicator fastened to a component moveable relative to the stick position sensor.

Such sensors are used, among other things, in an interior of hydraulic or pneumatic cylinders in order to know the exact extension of the piston/cylinder unit, which is of great importance for the control of the machinery and equipment operated therewith.

The position sensor is thereby located in a tight housing which comprises a long, slender sensor-stick-housing and a connected, shorter sensor sensor-head-housing which has a larger diameter and wherein the processor electronics are located.

Thereby, the sensor with its sensor-head-housing is located in the piston/cylinder unit in a longitudinal fixed manner so that the slender sensor-stick-housing extends into a typically central bore of the piston or the piston rod where the position indicator is mounted.

Since the sensor-stick-housing, and thereby the measuring length of the sensor, extends along an entire possible extension length of the piston rod, the current position of the piston rod relative to the cylinder is known at any time.

Thereby, the housing of the sensor at its exterior side is in direct contact with operating fluid of the piston/cylinder unit and is also exposed to its operating pressure. Especially in hydraulic units with very high pressures, therefore, it is of great importance that the sensor housing is provided stable and tight and that a sufficient sealing between the housing of the sensor and the piston/cylinder unit is provided, mostly through a respective seal at an exterior circumference of the sensor-head-housing relative to the surrounding wall of the pneumatic or hydraulic cylinder.

As a non-contacting sensor principle thereby differential transformatoric measuring procedures (LVDT's), non-contacting inductive measuring procedures (LVP's), inductive potentiometric measuring procedures (DC/DC-sensors), Eddy current procedures and often also magnetic, in particular magnetostrictive functional principles are being used. With the latter ones a permanent magnet is being used as a position indicator with other processes a tube sleeve, a submerged anchor, or a similar component. With PCLD-sensors through a magnet a virtual air gap is being created in a ferromagnetic core.

As it is well known, magnetostrictive position sensors function as follows:

A wave conductor typically consists of a tube, a wire, or a band and can also serve as an electric conductor. The wave conductor can also be located in a shape generating linear or circular body made from non-magnetic material, such as plastic or metal, for receiving the wave conductor and holding it in bearings.

Based on the Wiedemann-Effect an electric impulse fed into the wave conductor generates a mechanic elastic wave when superimposed with a position magnet.

At a certain location, typically at one end of the wave conductor, in particular, the torsion component of this mechanic/elastic impulse is detected by a detector unit, mostly located in a fixed position relative to the wave conductor. The duration between the triggering of the electrical excitation impulse and the reception of this mechanic-elastic wave, thereby, is a measure of the distance of the slideable position element, e.g. of a position magnet, from the detection device.

A typical such sensor is described in the U.S. Pat. Nos. 5,590,091 and 5,736,855.

Subsequently, only magnetostrictive position sensors are referred to without limiting the invention to this position measurement principle.

In such position sensors used in piston/cylinder units there are several problem areas.

One problem area is an increase of overall length of the piston/cylinder unit through the position sensor.

While the slender sensor-stick-housing extends into an interior of the piston rod, the wider sensor-head-housing requires a respective interior length in the cylinder of the piston/cylinder unit for housing, which increases the overall length of the piston/cylinder unit.

It is attempted to also shorten the sensor-head-housing in axial direction through miniaturization of the processing electronics housed in the sensor-head-housing. However, with most position sensors only a single cable exit direction is offered for the position signals from the sensor-head-housing, and this is mostly the axial exit of the cable or the connector from the front face of the sensor-stick-housing opposed to the sensor-head-housing.

However, when depending on the installed solution this front face of the sensor-head-housing is built over the cylinder unit, e.g. through a mounting eyelet required on this side of the piston/cylinder unit, the exit of the cable from the piston/cylinder unit has to be performed towards the side.

The necessary angulation towards the side of the cable exiting the sensor-head-housing alone, again, requires additional axial volume of the piston/cylinder unit.

An initially provided exit direction of the cable, or of the connector, perpendicular to the axial direction is disadvantageous, on the other hand, if in the actual installation situation a further axial track of the cable is required and insufficient space is available on the sides.

Repairs constitute anther problem area.

Due to the described, often high operating pressures in such piston/cylinder units and a rough operating environment, like for instance, strong vibrations as they often occur in equipment, a failure of the piston sensor can occur so that it needs to be replaced completely, or components of it, possibly a part of the processing electronics or of the wave conductor unit of the magnetostrictive sensor.

In this case the piston/cylinder unit had to be opened, until presently, and the whole position sensor with its housing had to be removed from the piston/cylinder unit since, especially due to the above mentioned operating conditions, the processing electronics in the sensor-head-housing of the sensor were generally encased solid.

However, this means that before removing the senso, the operating fluid in the respective piston/cylinder unit has to have ambient pressure, since otherwise large amounts of operating fluid exit into the environment and the connected actuators change positions unintentionally.

On the other hand, after replacing the position sensor, the respective piston/cylinder unit or the whole operating loop to which it is connected may have to be refilled or at least bled, which entails a considerable effort and poses an additional source for failures if performed incorrectly.

BRIEF SUMMARY OF THE INVENTION

Therefore, it is an object of the present invention to provide a stick-shaped position sensor according to the magnetostrictive operating principle which can be exchanged in a piston/cylinder unit without leakage, thus without opening the loop of the operating fluid, and/or, in addition, requires only little axial space for housing a sensor-head-housing in a cylinder unit.

Through locating an easily removable sensor-head-cover on the sensor-stick-housing so it faces away from the sensor-head-housing, the functional components of the position sensor initially in the sensor head housing, and after removal of the functional components located there, also in the stick housing, can be reached and extracted completely, without having to remove the housing of the sensor from its installed position.

Easy disassembly in this context means primarily disengaging a positively locking connection, thus a thread, a lock ring or a similar component and, in particular, not disassembling a connection which is not meant to be disassembled, such as a glue joint, an encasement, a weld, a solder joint, or similar though thereby under certain circumstances the lid would not be destroyed, but the respective connection area.

When the sensor-head-cover can thus be disassembled without destruction and can be reassembled, therefore, even the same sensor-head-cover can be used again.

Thereby, it is possible to leave the housing of the position sensor in its sealed assembled position in a piston/cylinder unit, while the position components of the position sensor are tested, repaired, or replaced. Therefore, a draining of the operating medium and a subsequent pressurization and bleeding is not necessary, so that work on the sensor can be performed much quicker.

All functional components of the sensor can be replaced this way, including the whole position sensor, besides its outer housing. Replacing the sensor housing itself is rarely necessary since the housing is typically stable enough so that it is not damaged during normal operation.

In order for removal of the functional components and of the sensor-head-cover to be performed with as few problems as possible, an extraction in axial direction towards the side facing away from the sensor-stick-housing is provided.

This is accomplished e.g. through the sensor-head-cover extending into an interior diameter of a wall of the sensor-head-housing and being secured there through positive locking, thus through a thread or a securing element like a lock ring.

In order to keep the axial space requirement in the installation environment for the sensor-head-housing and, thereby, for the position sensor as small as possible, the connection towards the outside from the sensor-head-housing and from the processing electronics located therein are designed specifically either with a connector located in the sensor-head-housing or with a cable exit for passing through the cable.

The sensor-head-cover has a high dome, and the cable exit or the connector is located in its side wall. Through positioning not in the enveloping surface of the side wall but through the side wall of a cylindrical shape having an indentation, preferably a flat area formed as a secant, the cable outlet can be located in this indentation or flat area and, thereby, it does not extend exactly radially but partially tangentially out of the dome area.

Especially because the dome has a smaller exterior diameter than the sensor head, it is possible to run a cable pointing away from the dome in this manner either according to the direction of the cable outlet or of the connector in a radial-tangential manner through the surrounding components to the outside, or to angulate the cable in the area of the flat or indentation into the axial direction and to run it away. Even a partial running of the cable is possible around the dome over a part of the circumference in order to run the cable at a certain location of the circumference axially or radially further to the outside. For the often occurring case of running the cable away in a radial or tangential manner from the sensor-head-housing, thereby, the otherwise required room for angulating the cable is no longer required, so that for the volume requirement only the actual axial extension of the sensor-head-housing, including the dome of the sensor-head-cover, need to be considered.

The cable outlet can be provided through a connector or a cable pass-through opening, e.g. a cable grommet inserted into a bore of the outer wall or also through an interior thread fabricated into this bore whose diameter is sized relative to the outer circumference of the cable to be run through so that the core diameter of the interior thread is smaller than an exterior diameter of insulation of the cable but larger than an interior diameter of the cable. Thereby, the cable insulation is threaded in the interior thread and fixed in a longitudinal direction.

In order to make the exit of the cable or socket possible at any desired location on the circumference, the sensor-head-cover is preferably usable in any rotation position relative to the sensor-head-housing and can be fixed there preferably through positive locking between the sensor-head-cover and the sensor-head-housing.

The housing of the sensor is fixed in the surrounding unit, such as the piston cylinder unit, with a thread and sealed with a gasket. The thread is either located in an outer circumference of the sensor-head-housing or in an outer circumference of the sensor-stick-housing in the section adjacent to the sensor-head-housing, preferably in a diameter area slightly enlarged relative to the sensor-stick-housing. The seal is hereby located on the side of the thread opposite to the sensor-stick-housing in order not to be able to damage the gasket through contact through the interior thread of the surrounding component.

If an O-ring is used for a gasket, a support ring located axially behind it is to be preferred due to the high occurring pressures. In order to be able to tighten the thread sufficiently, the outer circumference of the sensor-head-housing is partially provided as an external hexagonal shape in order to be able to apply an opened end wrench.

Also, in order to protect the processing electronics against strong vibrations while still being able to replace the processing electronics and/or the wave conductor unit without having to open the tight installation of the housing of the position sensor in the surrounding assembly group, inside the sensor-head-housing an inside dish can be provided opened toward the sensor-head-cover, e.g. made from plastic, inside which the processing electronics are located and encased relative to the interior dish. The encased electronics can be replaced as a separate component after disconnecting the signal wires and after removing the unit consisting of the processing electronics and the interior dish and the wave conductor unit located behind it can be extracted because of the tight reception of the interior dish in the sensor-head-housing and of the signal connections, e.g. plug connections or threaded connections of the processing electronics, on the one hand, toward the wave conductor unit and, on the other side, toward the cable exit.

A mounting of the interior dish with little clearance and thereby without vibration relative to the sensor-head-housing can be performed through axial clamping with the sensor-head-cover to be inserted.

The cover for closing the head housing can furthermore be used for performing error diagnosis and/or programming of the processing electronics located in the interior of the head housing in a simple manner.

Thus, the processing electronics in the interior of the head housing can include a light source, such as an LED or an infrared unit, emitting only light of a certain wave length.

When the lid consists of a material, such as plastic, which is permeable to all light or at least to light of this special wave length, an optical signal emitted by the light source located in the interior of the head housing, e.g. a flash rhythm, can be detected from the outside in a non-contact manner and/or vise versa wherein a respective sensor is located in the interior of the head housing and the respective light source is located externally.

A simple solution is to provide an opening in the lid at the location of the light source through which the light source and, thereby, the optical signal are visible. Thereby, however the housing is not tight anymore.

DETAILED DESCRIPTION OF THE DRAWINGS

Embodiments according to the invention are described in more detail.

FIGS. 1a through 1d show the position sensors according to the invention in a side view and in an axial face view from a sensor head housing.

FIGS. 2b through 2g show enlarged detail views of the sensor head areas.

FIGS. 3a and 3b shows the sensor carrier unit as a whole.

FIGS. 4a and 4b show a typical installation situation of a stick position sensor.

FIGS. 5a and 5b illustrate a position sensor with an alternative lid shape.

FIGS. 7a and 7b show a further design of the sensor of the present invention.

DETAILED DESCRIPTION OF THE INVENTION

Figure 1D:
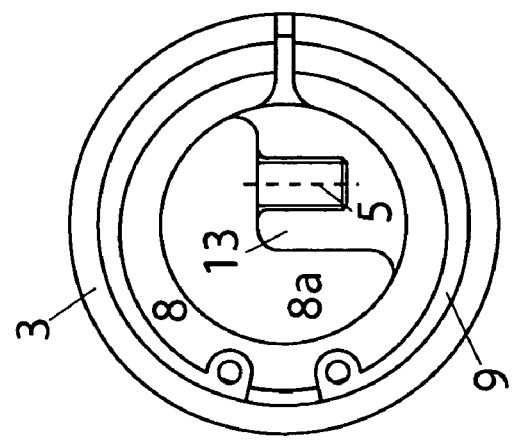

FIG. 1a shows a position sensor 1, e.g. a magnetostrictive type sensor, in side view.

In an interior of a sensor-stick-housing 2, extending in a longitudinal direction 10, a measuring device is located. Therein extends a wave conductor unit 24 visible only in a sectional view of FIG. 2f with a central wave conductor 23.

At a left end of sensor-stick-housing 2, a sensor-head-housing 3 is connected in a tight manner having an external diameter 12 several times larger than the diameter of sensor-stick-housing 2, but only has a fraction of its length. At a transition to sensor-stick-housing 2, sensor-head-housing 3 comprises an area 16 with an enlarged diameter relative to sensor-stick-housing 2 however significantly smaller than the largest diameter 12 of the otherwise cylindrical sensor-head-housing 3, which is dish shaped, thus open toward a front side, facing away from sensor-stick-housing 2.

Since sensor-stick-housing 2 is closed tight at the right end facing away from sensor-head-housing 3, e.g. through an end cap, the whole housing of the position sensor is open towards the left end as in FIGS. 1 and 2, and closed there by a sensor head cover 8 having a central dome 8a protruding beyond the open face of sensor-head-housing 3 as seen in the FIGS. 1 and 2 towards the left.

Figure 2A:
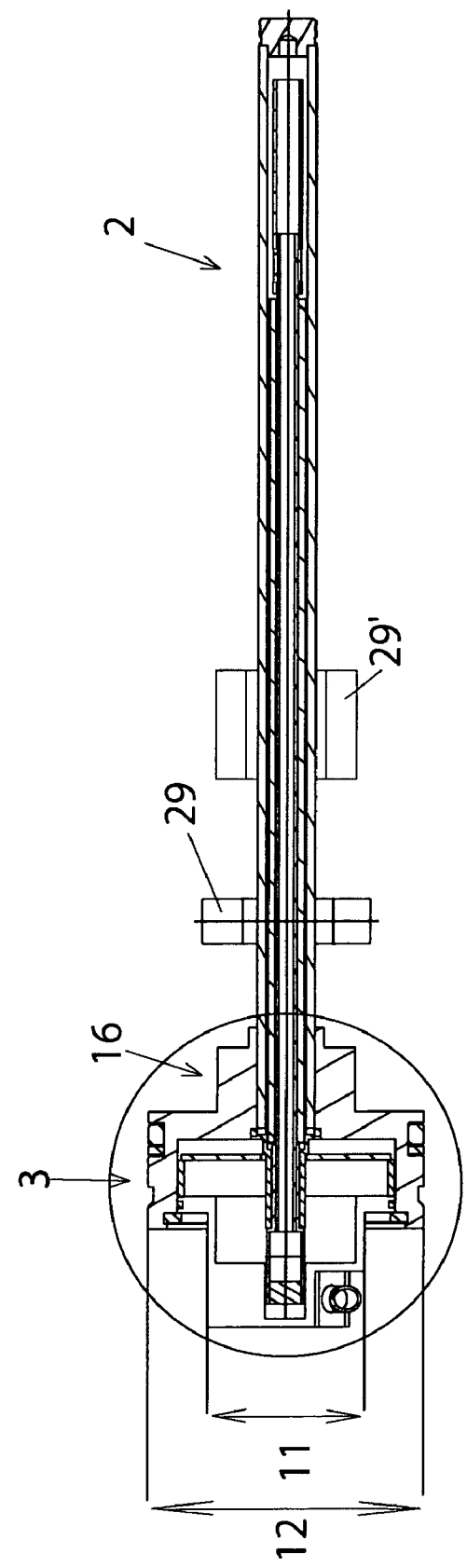
FIG. 2a shows the position sensor according to FIG. 1a in a longitudinal sectional view.

Along sensor-head-housing 2, an annular position magnet 29 is moved in a radial distance and without contacting. The position of position magnet 29 in longitudinal direction 10 is to be measured by position sensor 1. An alternate sleeve-shaped position indicator is shown in FIG. 2a.

Figure 2B:
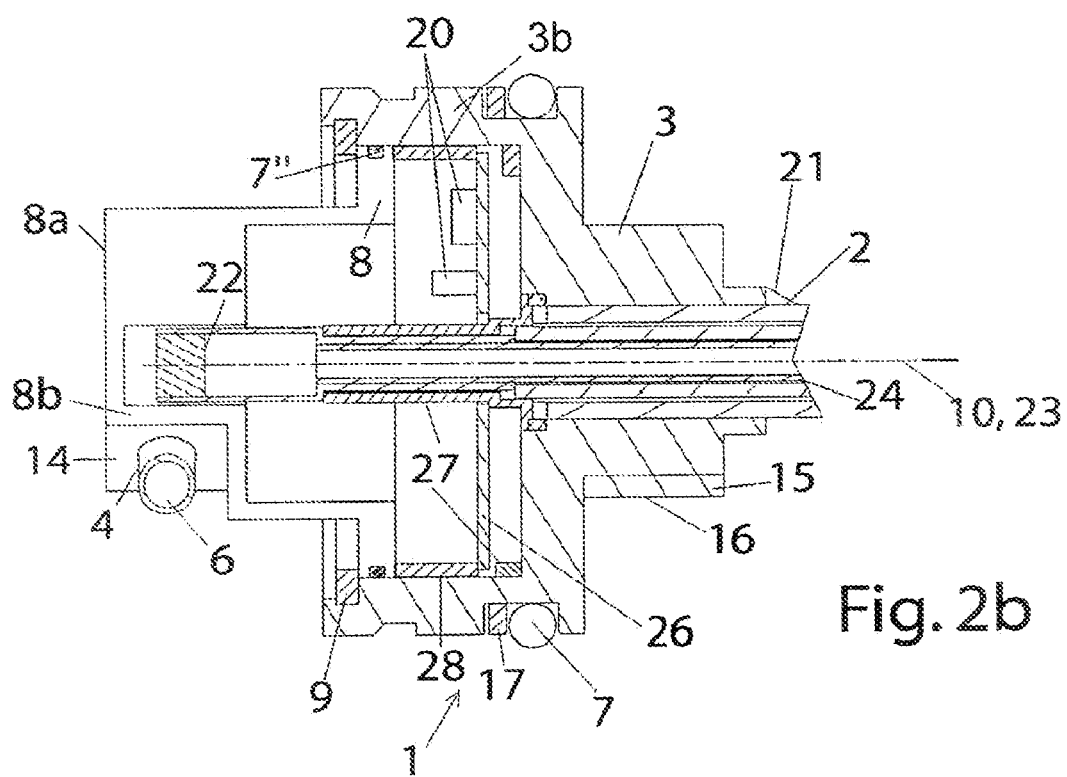

FIG. 2b shows an interior layout of position sensor 1 in an enlarged longitudinal cross section, especially in the head area, which is of particular interest here.

Initially, a housing of the position sensor is manufactured by inserting stick-sensor-housing 2 into an opening of a bottom of the dish-shaped sensor-head-housing 3 and connecting it on an exterior side of sensor-stick-housing 2, or its front face with sensor head housing 3 through at least one annular circumferential weld 21 in a tight manner. Sensor stick housing 2 is also sealed tight at the other end through a cover lid, which is also welded on.

The functional elements of position sensor 1 are installed into this housing, wherein initially a positioning sleeve 27 is placed onto a mouth of a pass-through in the bottom of sensor-head-housing 3 in axial direction in a positively locking manner. It is pressed onto the bottom of an indentation of sensor-head-housing 3 and fixed by inserting a dish-shaped printed circuit board 26 over an exterior circumference of positioning sleeve 27, onto which processing electronics 20 are built. Positioning sleeve 27 is axially fixed through engaging an outer rim of printed circuit board 26 with a spacer sleeve 28 in an axial manner, which on the other hand is engaged by a sensor-head-cover 8 inserted into a free space of sensor-head-housing 3 and fixed through a lock ring 9. Through a respective annular shoulder in sensor-head-housing 3, positioning sleeve 27 is also radially fixed in sensor-head-housing 3.

Before inserting sensor head cover 8, a wave conductor unit 23, which extends substantially over a whole length within sensor-stick-housing 2, is moved forward through positioning sleeve 27 into sensor-stick-housing 2 until a shoulder of the rearward, slightly expanded end of a sensor carrier unit 24 touches at a front annular face of positioning sleeve 27. Detector unit 22 is located within sensor carrier unit 24.

In this final position, sensor carrier unit 24, in whose longitudinal middle the indicated wave conductor 23 extends, protrudes in the direction of sensor-head-cover 8 beyond printed circuit board 20 of processing electronics 20 into a dome 8a of sensor-head-cover 8. Through a long overhang over a plane of processing electronics 20 a dead zone of the position sensor is reduced, where no position determination is possible. At the right end, facing away from sensor head housing 3, a damper can be seen at sensor carrier unit 24, damping an electro mechanic wave arriving in wave conductor 23.

FIG. 2b furthermore shows a gasket 7" located in an exterior circumference of sensor-head-cover 8 through which a penetration of dust into an area of the processing electronics is to be prevented.

However, it can be difficult to avoid turning head cover 8 in sensor-head-housing 3 with this mounting of cover 8 in the head housing through a radially abutting gasket 7", and through axially positively securing through locking ring 9. This can have a disadvantageous effects on the cable connections.

Alternatively, FIG. 2f shows a mounting method wherein an outer edge 8c of cover 8 pointing into an interior space of sensor-head-housing 3 is beveled so that in the non-beveled, internally circumferential abutting shoulder of sensor-head-housing 3 an annular free space remains which is triangular in cross section. As shown in the expanded illustration of FIG. 2f, in this free space a gasket 7", preferably an O-ring made from elastic material, is housed and sized so that it is wedged at the respective axial shoulder of sensor-head-housing 3 in a free space 41, when cover 8 comes into axial contact, thereby imparting axial and radial forces onto cover 8.

Through the radial support of the gasket or the O-ring at sensor-head-housing 3 and also at cover 8, penetration of dirt into the interior and thereby into processing electronics 20 is avoided. Through axial compression, cover 8 is pressed against an interior side of a lock ring 9, and thereby through force engagement is prevented from turning relative to lock ring 9, and also turning of lock ring 9 relative to sensor-head-housing 3 is reliably prevented, whereby the strength of this force engaging connection depends on the degree of compression and elasticity of gasket 7".

In the same way, a dish 28 receiving processing electronics 20 and printed circuit board 26 in an interior of head housing 3 can be secured against rotation in sensor-head-housing 3. The dish on the other hand is supported at its free end at a bottom side of cover 8, again, axially preloaded through a gasket 7" compressed between the bottom of sensor-head-housing 3 and an outer edge of the bottom of interior dish 19 into a triangular free space 41.

On a large cylindrical outer circumference of sensor-head-housing 3 a first annular groove close to sensor-stick-housing 2 can be seen, wherein a seal 7 is shown as an O-ring sealing relative to the surrounding component. In an axially connecting direction towards a free end of sensor-head-housing 2, a support ring 17 is located in the same groove, greatly increasing the load bearing capability of O-ring 7 and preventing a squeezing out of the groove under pressure.

In a second annular groove located towards the free end in FIG. 2b further to the left, an additional supplementary O-ring can be located in an outer circumference as shown in the lower half of the picture.

This layout of the outer circumference and sealing relative to the environment is also chosen in the solution according to FIG. 2f.

On the other hand, in a solution according to FIG. 2g, outer circumferential seal 7 is located in an outer circumference of an enlarged diameter area 16 at a transition between sensor-head-housing 3 and sensor-stick-housing 2.

An upper half of the picture shows how an exterior hexagonal shape 18 can be provided on an exterior circumference of sensor-head-housing 3 for engaging an opened end wrench in order to be able to thread or tighten it.

Thereby, a significant feature is the shape of sensor-head-cover 8 and the manner of running cable 6 out of sensor-head-housing 3 in order to be able to conduct data derived by processing electronics 20 and to process it outside of the sensor. For this, exit of cable 6 through a cable exit 4 is illustrated. However, a connector or a connector socket could be located in sensor head cover 8 at the same location and in the same orientation as cable exit 4. An illustration of a further path of cable 6 in an interior of sensor-head-housing 3 was left out in order to make FIGS. 2b, 3 and 4 clear.

Also FIG. 2b in connection with a face view of FIG. 1b shows sensor head cap 8 with its exterior circumference located tight in an interior circumference of dish shaped sensor-head-housing 3. A cap shaped dome 8a thereby extends out of the interior of sensor-head-housing 3 with a reduced exterior diameter relative to an outer rim of sensor-head-cover 8 toward the left, thus out of an opening of sensor-head-housing 3. Into dome 8a protrudes, on the one hand on the interior side, sensor carrier unit 24 with its left end and, on the other hand in side wall 8b of dome 8a, is located cable exit 4 for cable 6.

As FIG. 1b shows, a cylindrical enveloping surface of side wall 8b has an indentation 13 toward the inside, e.g. shaped as a secant, through which a flat area 14 is formed, displaced from an outer circumference of dome 8a toward the inside, wherein cable outlet 4 is located. Cable 6 thereby is not completely radial at the location of the cable outlet, but slightly tangential to the enveloping surface of dome 8a, wherein indentation 13 is preferably sized so that in its area the cable exiting from cable outlet 4 within indentation 13 can be bent into the desired path without nicking, either into a further axial path or into a radial or tangential path.

Figure 1C:
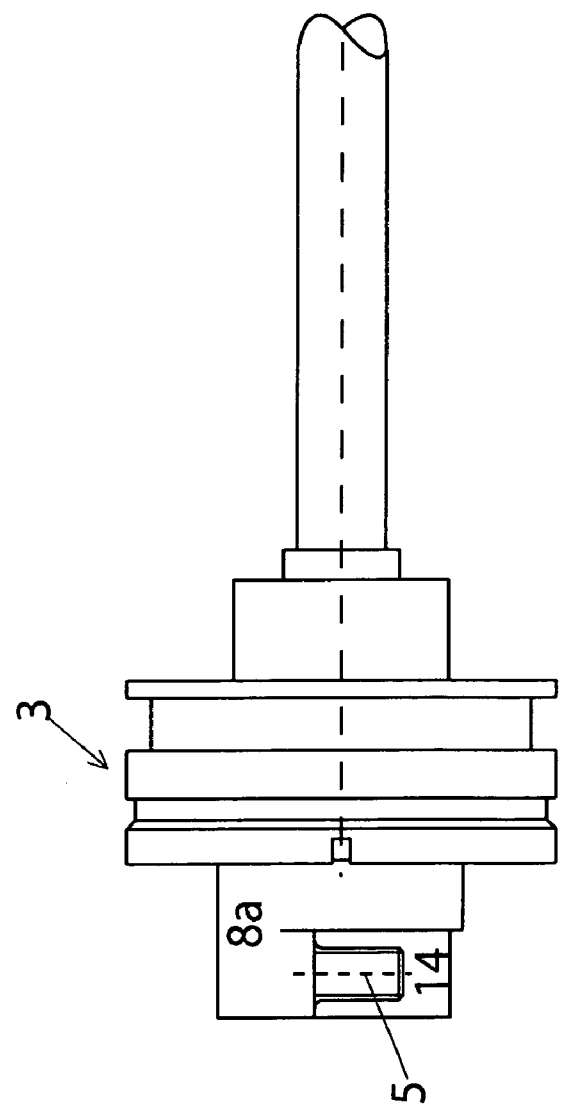

The FIGS. 1c and 1d, on the other hand, show a solution wherein at the same location at dome 8a, a connector 5 is located as a cable exit for inserting a connector, which is not shown.

Figure 6B:
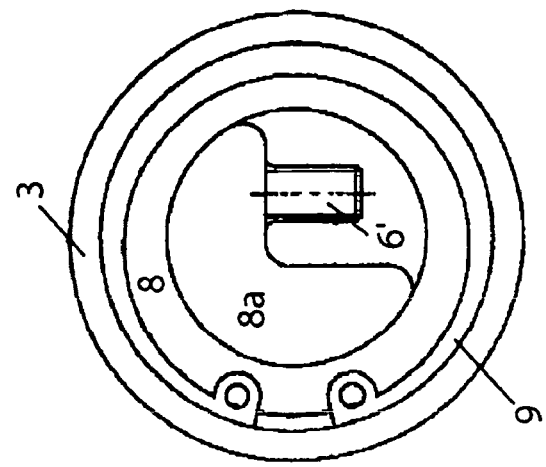
FIGS. 6a and 6b show an alternate design of the sensor of the present invention.
Figure 6A:
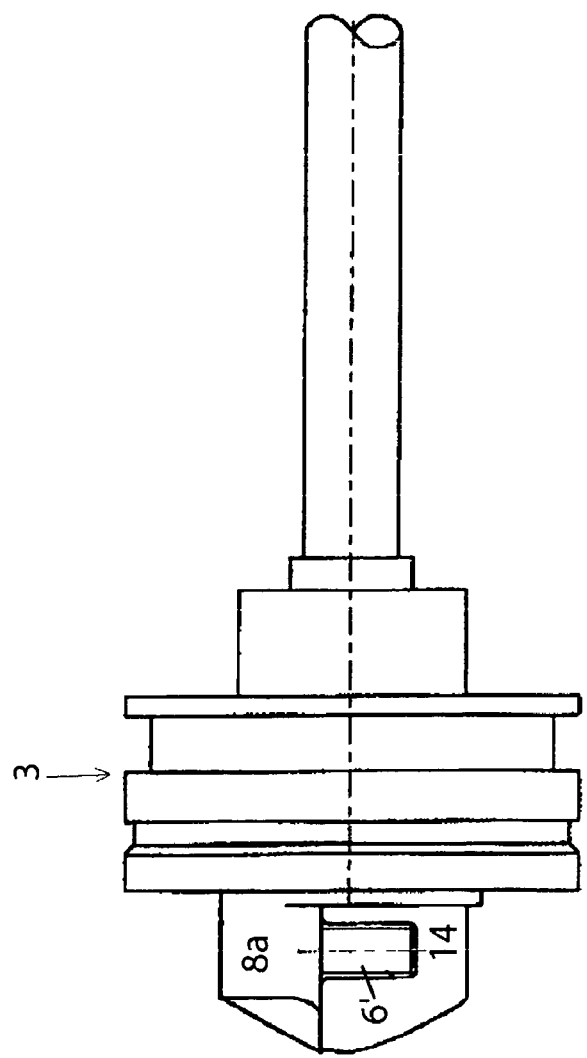

The FIGS. 6 and 7 show further embodiments of the shape of dome 8a in lid 8 which are different than those seen in FIG. 1.

While the dome in side view, thus seen perpendicular to the longitudinal direction 10 in the FIGS. 1a and 1b is substantially rectangular, dome 8a in the solution according to FIGS. 6 and 7 in side view is beveled at an outer circumferential annular edge.

FIG. 6 shows a variant with a connector socket 6' as cable outlet 4; while in FIG. 7b cable 6 is run out of an opening in dome 8a without a connector.

The design of the sensor-head-housing with dome 8a thereby entails, besides gaining space for installing the connector or cable, a reduced installation space requirement in axial direction for the head area of the position sensor in e.g. a piston/cylinder unit 30, as shown in FIG. 4.

Piston/cylinder unit 30, of which only one end is shown in FIG. 4, comprises a cylinder 32 shaped as a tubular section closed on one side through a face plate 34. At an interior circumference of cylinder 32, a piston 33' abuts tight but moveable, forming a thickened end of a piston rod 33 located in cylinder 32. Face plate 34 has a central pass-through opening 34a.

Position sensor 1 is located with thicker sensor-head-housing 3 on/or in face plate 34 and extends with slender sensor-stick-housing 2 through pass-through opening 34a and piston 33' into a central dead end bore of piston rod 33; having a slightly larger diameter, so that no contact can occur between piston rod 33 and sensor-stick-housing 2. The element acting as a position indicator for the position of piston 33', e.g. the annular position magnet 29, is inserted into piston 33' and/or the piston rod.

Due to the position of a slideable piston 33' shown in FIG. 4, between the piston and the cylinder in this case only a small amount of operating fluid 31 is enclosed, wherein, however, it is apparent that this operating fluid is in direct contact with the housing of position sensor 1.

Most piston cylinder units 30 have to be coupled at their two longitudinal ends with abutting components and, for this purpose, have to comprise a respective mounting element on both ends, e.g. a depicted mounting eyelet 37.

Mounting eyelet 37 cannot be directly mounted to face plate 34 or provided in one piece together with it, since on the side of face plate 34 facing away from piston 33', sensor-head-housing 3 of position sensor 1 is located and mounted, and it has to be disassembled.

A front cover 35 is placed therefore onto a free front face of face plate 34 and mounted through longitudinal threading 36. On the one hand, sensor-head-housing 3 is protected and covered. On the other hand, at the free end of this front cover 35 the necessary mounting element can be mounted, such as mounting eyelet 37.

Figure 4A:
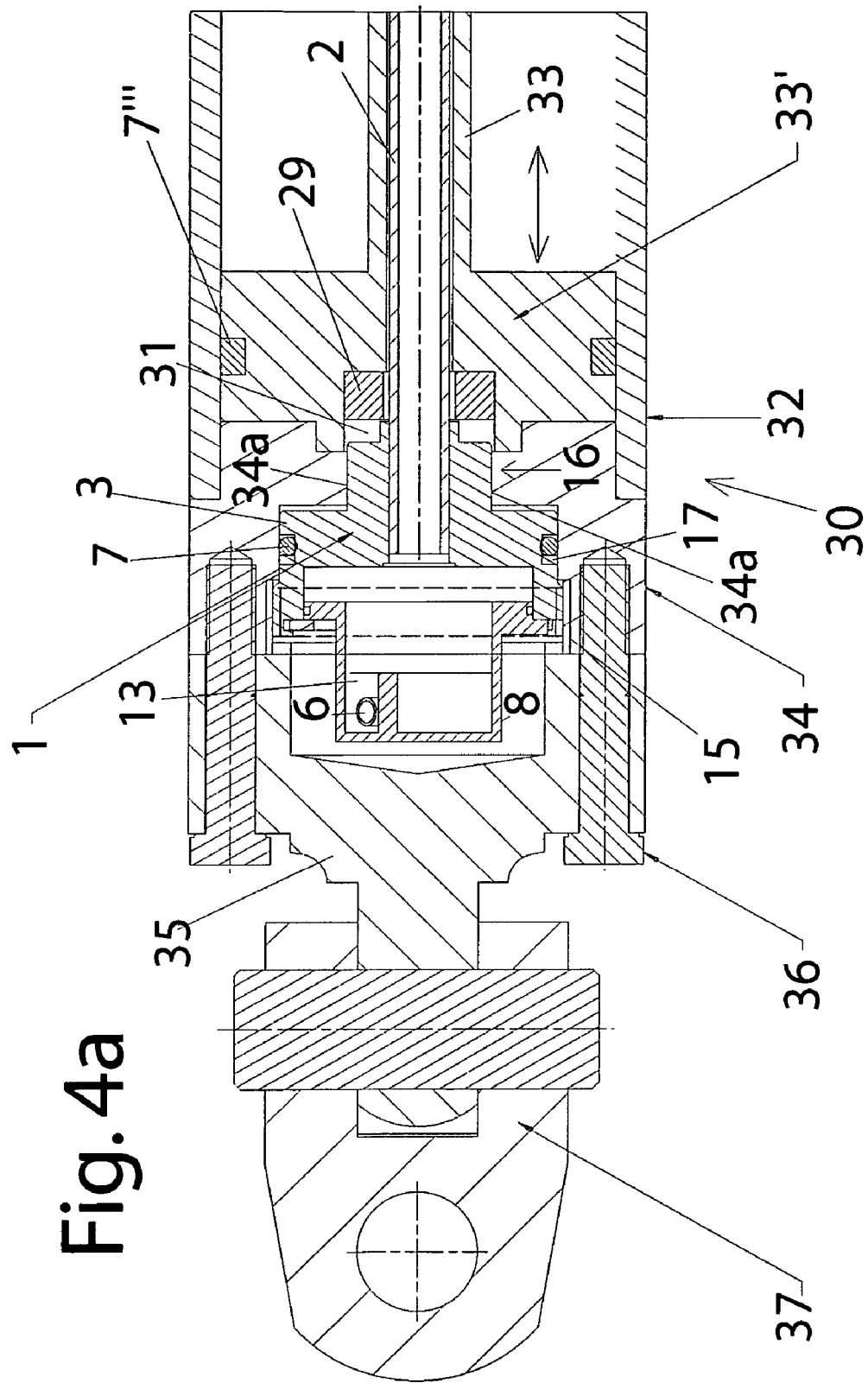

Thereby, FIG. 4a shows that front cover 35 can reach close to the front end of sensor-head-housing 3, thus sensor head cover 8, since no additional axial space is required for cable 6 to axially run out of the sensor head cover. Cable 6 can either be run out through face cover 35 radially between threads 36 or can be run out in an axial manner, wherein for deflecting into axial direction indentation 13 in dome 8a is sufficient, as shown in FIG. 4b.

In comparison, FIG. 4b shows the advantage of a beveled circumferential edge of dome 8a of lid 8.

Thereby, an interior contour in a superimposed front cover 35 between an interior wall and a bottom can be beveled, which greatly improves the torsion resistance of front cover 35 relative to a rectangular position of FIG. 4a in this location, since in such a beveled interior edge the occurrence and inception of a fatigue fracture is much less likely than with a sharp rectangular interior circumferential edge, as in the front cover 35 according to FIG. 4a. Analogously, front cover 35 can have reduced dimensions with a beveled interior edge according to FIG. 4b.

On the other hand, FIG. 4 shows that after loosening threaded connection 36 and removing front cover 35, the functional components of functional positional sensor 1 are accessible and can also be replaced without having to loosen the tight connection between the housing, ⅔ of the sensor and the face plate 34, and thereby from piston cylinder unit 30 in its entirety.

It is only necessary to pull off sensor cover 8 in order to get into the interior of sensor-head-housing 3 and thereby to the processing electronics housed therein (not shown in FIG. 4) or also after its removal, to be able to pull wave conductor unit 23 out of sensor-stick-housing 2.

Such a complete sensor unit, comprising sensor carrier unit 24 including wave conductor 23 located therein, detection unit 22 and interior dish 19 with processing electronics 20 housed therein, which is not shown, FIG. 3a also shows in a longitudinal sectional view, wherein in this solution, the interior dish 19 is connected with all other mentioned components in a positively manner into a unit, which can be handled in its entirety.

On the other hand, FIG. 3b shows a sensor unit according to another measuring principle in which a coil 42 extends along sensor carrier 24 in measuring direction instead of a wave conductor. Also a magnet 29 or another element is being used as position generator.

Figure 2C:
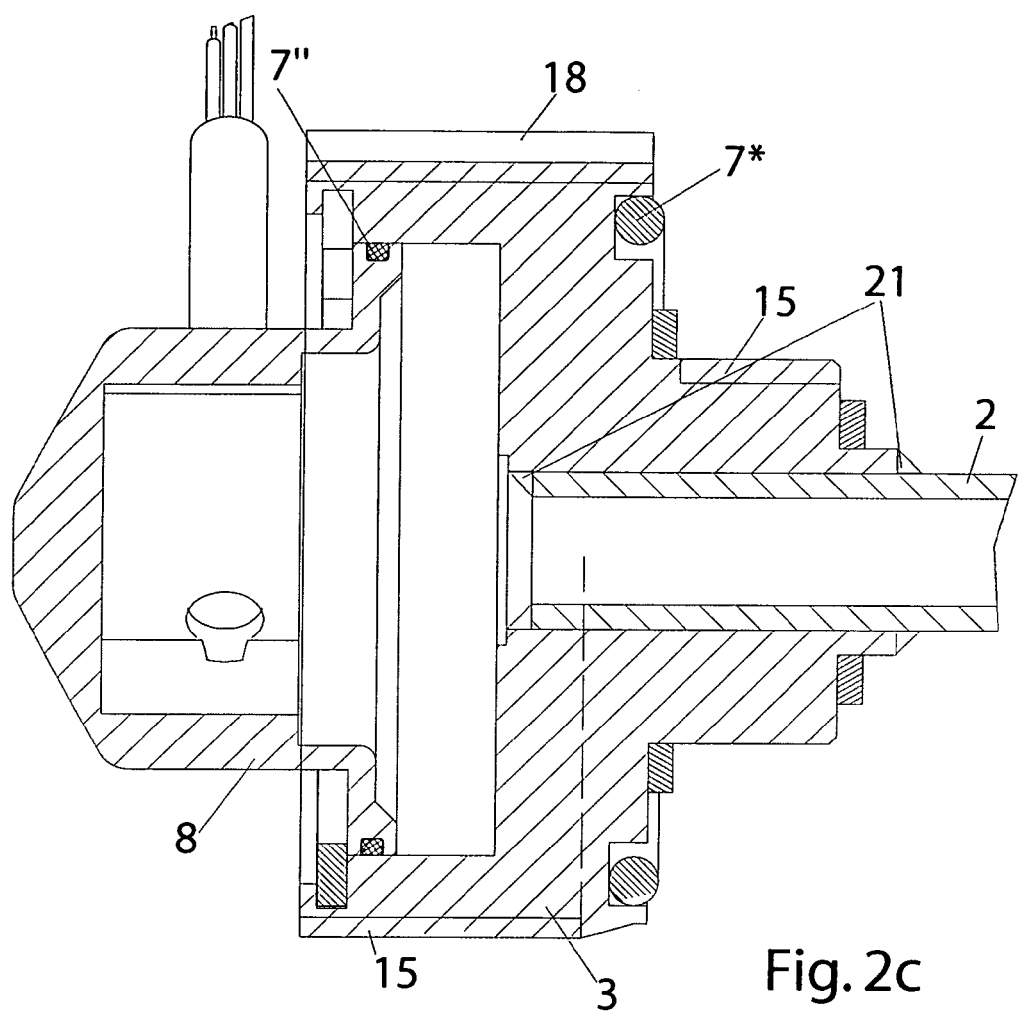
Figure 2D:
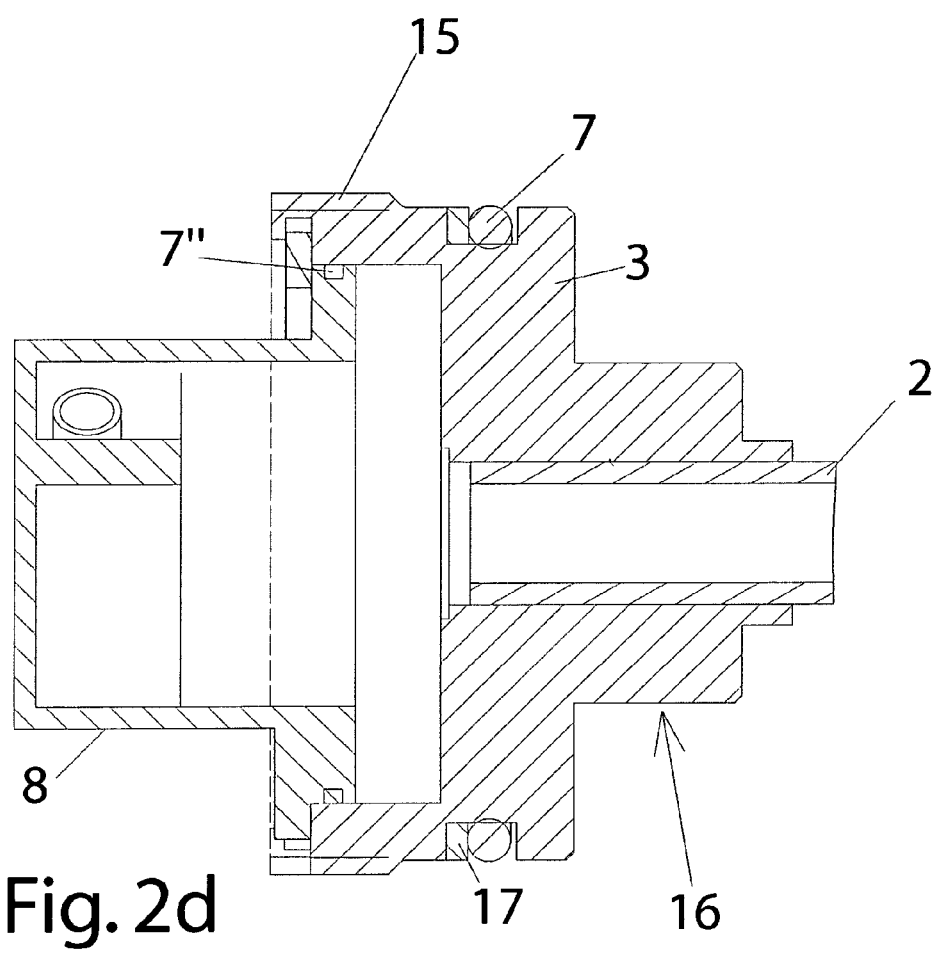

In case of FIG. 4, the exterior circumference of the sensor-head-housing and the mounting and sealing relative to the piston cylinder unit are designed differently from FIGS. 1 and 2, thus analogous to FIG. 2d.

The area 16 with an enlarged diameter relative to sensor-stick-housing 2 at the transition between sensor-stick-housing 2 and sensor-head-housing 3 serves only for mechanical central alignment in pass-through opening 34a of face plate 34 and does not have an external thread.

The mechanical fixation between sensor-head-housing 3 and face plate 34 is performed through a thread 15 at an outer circumference of sensor-head-housing 3 close to its free end and through a respective interior thread in face plate 34. The sealing between both components is performed via a seal 7 with an adjacent support ring 17 in a respective annular groove in the outer circumference of sensor-head-housing 3 on the side facing sensor-stick-housing 2, which is supported by an interior diameter of face plate 34 which is reduced relative to thread 15.

Figure 2E:
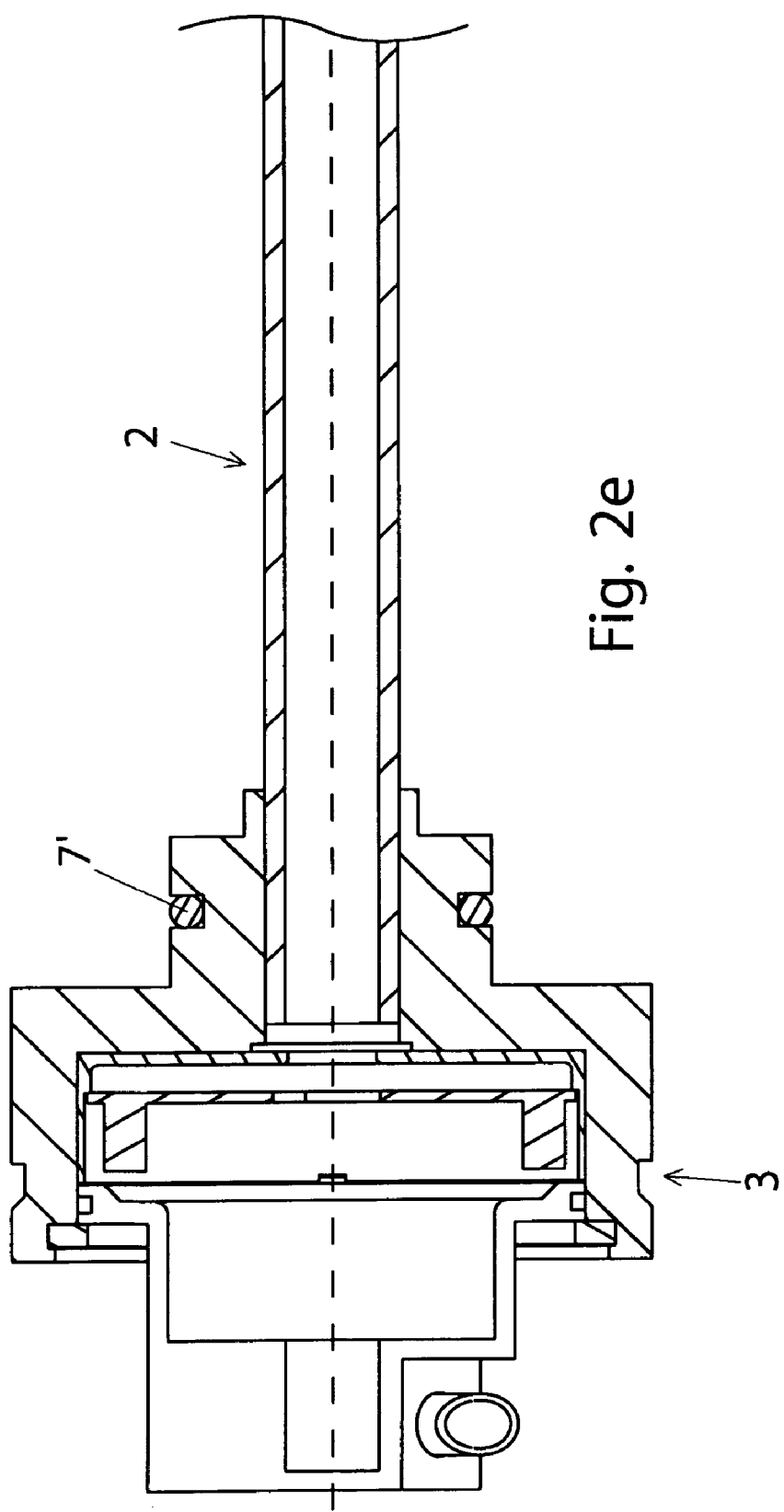

FIGS. 2e and 2g also show a radial seal ring 7, however, positioned in a groove radially open to the outside not of the large exterior diameter 12, but of the enlarged diameter area 16 at a transition between sensors-stick-housing 2 and sensor-head-housing 3.

Instead of the radial seal ring 7, a seal 7*, as shown in FIG. 2c, can be located at a shoulder of the sensor head housing 3 in a groove open in an axial direction toward sensor-stick-housing 2, supported against a respective frontal shoulder of front plate 34, e.g. when tightening thread 15.

Furthermore, FIG. 5a shows another design of the head area in a longitudinal sectional view, differing from the analogous depiction of FIG. 2b with regard to the design of the cover.

The lid cover does not have a dome, but it is a flat cover with a pass-through opening in the middle through which in a customary manner, using a protective cable grommet made from rubber or plastic. Cable 6 extends from the inside to the outside.

Furthermore, in FIG. 5a at a location in the interior of the head housing, a LED 38 is shown in the processing electronics, located under a respective LED opening 39 in the cover 8, so that the lighting or non-lighting of this LED 38 can be seen from the outside through the opening 39.

Alternatively, to this non-tight variant with opening 39, an infrared unit 40 can be located in the interior of the head housing 3, including an infrared sensor and/or a infrared source. The cover 8 is made from a material which is permeable for infrared light. Thereby, the transmission of optical signals through infrared light through the otherwise tight closing cover is possible for error diagnosis and programming of processing electronics 20 in the interior of the head housing 3.

This design, without dome 8a in lid 8, is suitable for very small processing electronics 20 or for housing of the processing electronics outside head housing 3. Also, with this design a leak free repair and a replacement of the sensor unit is possible through the removable lid 8.

FIG. 5b shows the installation situation of this variant into a piston cylinder unit according to FIG. 4.

REFERENCE NUMERALS

1 Position sensor
2 Sensor stick housing
3 Sensor head housing
3a Wall
3b Flange
4 Cable exit
5. Connector
6 Cable
6'. Connector socket 7 Seal
7', 7'', 7* Seal
8, 8' Sensor head cover
8a Dome
8b Side wall
8c Outer edge
9 Lock ring
10 Longitudinal direction
11 Diameter
12 Outer diameter of the sensor head housing
13 Indentation
14 Flat surface
15 Thread
16 Enlarged diameter area
17 Support ring
18 External hexagonal shape
19 Interior dish
20 Processing electronics
21 Weld
22 Sensor element
23 Wave conductor
24 Sensor carrier unit
26 Printed circuit board
27. Positioning sleeve
28 Spacer
29 Position indicator magnet
30 Piston cylinder unit
31 Operating fluid
32 Cylinder
33 Piston rod
33' Piston
34 Face plate
34a Pass-through opening
35 Front cover
36 Longitudinal thread
37 Mounting eyelet
38 LED
39 LED opening
40 Infrared unit
41 Free space
42 Coil

What is claimed is:

1. A position sensor according to a non-contacting magnetic functional principle, in an enclosed sticks design for use in fluids, said sensor comprising:
   a sensor-stick-housing (2) being connected with a sensor-head-housing (3) to form a sensor housing;
   a sensor unit including functional components of the position sensor and being located in the sensor housing;
   processing electronics (20) or a connection element to the outside being located in the sensor-head-housing;
   a cable running out of the sensor-head-housing (3) through a cable outlet (4) or a connector (5);
   an axial seal or radial circumferential seal (7) on the outside of the sensor-head-housing (3) and/or the sensor-stick-housing (2); and
   a sensor-head-cover (8) for closing the sensor-head-housing (3) on a front face pointing away from the sensor-stick-housing (2);
   said sensor-head-cover (8) has the shape of a cap with a hollow dome (8a) extending axially outwards and having a smaller diameter than an outside diameter (12) of the sensor-head-housing (3); and
   wherein in said sensor-head-housing (3), an internal dish (19) is located, opened toward said head cover, and said processing electronics (20) are located and encased tight, and wherein the internal dish (19) can be removed from said sensor-head-housing (3).

2. The position sensor according to claim 1 wherein said cable outlet (4) or a connector (5) is located radially in a side wall (8b) of said dome (8a), and said cable outlet (4) in said sensor cover (8) is provided as a cable grommet (21) or as a thread (15).

3. The position sensor according to claim 1 wherein said cable outlet (4) is located in an indentation (13) provided as a secant of an outer circumference (11) of said dome (8a).

4. The position sensor according to claim 1 wherein said sensor-head-cover (8) can be inserted and fixated in any desired rotation position relative to said sensor-head-housing (3) by a positively interlocking connection between said head cover (8) and said sensor-head-housing (3).

5. The position sensor according to claim 1 wherein a rotation position between said head cover (8) and said sensor-head-housing (3) can be fixated through a friction locked means between said head cover (8) and said sensor-head housing (3) or through an axially compressed O-ring or lock ring.

6. The position sensor according to claim 5 wherein said O-ring is compressed in a free space with diagonal cross-section, which is formed to be sealed relative to each other.

7. The position sensor according to claim 1 wherein in a lateral view said dome (8a) has beveled or rounded upper edges covering at least ¼ of a diameter of said dome (8a).

8. The position sensor according to claim 1 wherein an area of said sensor-stick-housing (2), which directly abuts to the sensor-head-housing (3) and whose diameter is enlarged when compared to the diameter of the remaining sensor-stick-housing (2), a thread (15) is located at the outer circumference of said sensor-stick-housing (2).

9. The position sensor according to claim 1 wherein a thread (15) on an outer circumference of said sensor-head-housing (3) is located on a side opposite to said sensor-stick-housing (2) of said seal (7).

10. The position sensor according to claim 1 wherein said seal (7) is an O-ring seal with an axial support ring (9) located behind it.

11. The position sensor according to claim 1 wherein an outer circumference of said sensor-head-housing (3), along at least a part of its axial extension, is provided as an external hexagonal shape (18) for applying an opened end wrench.

12. The position sensor according to claim 1 wherein said cable outlet (4) is located at said sensor head housing (3) in a radial manner.

13. The position sensor according to claim 1 wherein a signal connection between a detector unit (22) at a wave conductor (23) and said processing electronics (20) is detachable via a connector.

14. The position sensor according to claim 1 wherein said head cover (8) is made from plastic which is permeable for at least a certain wavelength for infrared light or daylight.

15. The position sensor according to claim 1 wherein in said sensor-head-housing (3) at least one light indicator (38) is located, and located in said cover (8) is a light opening (39) through which the light emitted from said light indicator (38) is visible, whereby said light indicator (38) as well as the light opening (39) are located in the center of the base- and interior cross-section.

16. The position sensor according to claim 1 wherein in an interior of said sensor-head-housing (3) an infrared unit (40) comprising an infrared source and/or a infrared sensor are located for programming and/or error diagnosis of the sensor.

17. The position sensor according to claim 1, wherein a signal connection between a detector unit (22) at a wave conductor (23) and said processing electronics (20) is realized in a non-contacting manner.

* * * * *